US007472351B1

(12) United States Patent
Zilka

(10) Patent No.: US 7,472,351 B1
(45) Date of Patent: Dec. 30, 2008

(54) E-MAIL MANAGER INTERFACE WITH INTEGRATED INSTANT MESSAGING AND PHONE CALL INITIATOR FEATURE

(76) Inventor: Kevin J. Zilka, 1067 Laurie Ave., San Jose, CA (US) 95125

( * ) Notice: Subject to any disclaimer, the term of this patent is extended or adjusted under 35 U.S.C. 154(b) by 264 days.

(21) Appl. No.: 11/207,428

(22) Filed: Aug. 18, 2005

Related U.S. Application Data

(60) Provisional application No. 60/602,728, filed on Aug. 18, 2004.

(51) Int. Cl.
*G06F 3/00* (2006.01)
(52) U.S. Cl. .................. 715/748; 715/751; 715/752; 709/206; 709/217; 709/218; 709/219
(58) Field of Classification Search .............. 715/751, 715/748, 752; 709/206, 217, 218, 219
See application file for complete search history.

(56) References Cited

U.S. PATENT DOCUMENTS

| | | | |
|---|---|---|---|
| 6,396,513 B1 | 5/2002 | Helfman et al. ............. 715/752 |
| 6,507,845 B1 * | 1/2003 | Cohen et al. ................. 707/100 |
| 6,931,119 B2 * | 8/2005 | Michelson et al. ..... 379/265.13 |
| 7,142,646 B2 | 11/2006 | Zafar et al. .............. 379/88.17 |
| 2002/0023134 A1 * | 2/2002 | Roskowski et al. ......... 709/206 |
| 2002/0111140 A1 | 8/2002 | Kim ........................... 455/41 |
| 2003/0147381 A1 * | 8/2003 | Nelson et al. ............... 370/352 |
| 2003/0162544 A1 | 8/2003 | Austin et al. ................ 455/445 |
| 2004/0010431 A1 * | 1/2004 | Thomas et al. ................. 705/7 |
| 2004/0078448 A1 * | 4/2004 | Malik et al. .................. 709/206 |
| 2004/0116120 A1 | 6/2004 | Gallagher et al. ............ 455/436 |
| 2004/0131078 A1 | 7/2004 | Gupta et al. ................. 370/466 |
| 2004/0146021 A1 | 7/2004 | Fors et al. .................... 370/331 |
| 2004/0172456 A1 | 9/2004 | Green et al. ................. 709/207 |
| 2005/0108338 A1 * | 5/2005 | Simske et al. ............... 709/206 |
| 2005/0131900 A1 | 6/2005 | Palliyll et al. ................. 707/10 |
| 2005/0271020 A1 | 12/2005 | Thermond ................... 370/338 |
| 2006/0101119 A1 | 5/2006 | Qureshi et al. .............. 709/206 |

FOREIGN PATENT DOCUMENTS

| | | |
|---|---|---|
| WO | WO 02/01823 A2 | 1/2002 |
| WO | WO 02/073886 | 9/2002 |

OTHER PUBLICATIONS

Office Action Summary from U.S. Appl. No. 11/119,461 which was mailed on Sep. 18, 2007.
Lotus white paper, "Real-time Collaboration with Lotus Sametime," Jan. 2001.

(Continued)

*Primary Examiner*—Ba Huynh
*Assistant Examiner*—John M Heffington
(74) *Attorney, Agent, or Firm*—Zilka-Kotab, PC

(57) ABSTRACT

A system, method, computer program product and interface is included for providing an e-mail viewer pane including a sender identifier and text of an e-mail that is received from the sender; and an icon displayed simultaneously with the e-mail viewer pane for initiating a phone session with the sender upon the selection of the icon.

31 Claims, 7 Drawing Sheets

OTHER PUBLICATIONS

U.S. Appl. No. 11/119,461, filed Apr. 29, 2005.
Final Office Action Summary from U.S. Appl. No. 11/119,461 which was mailed on Apr. 10, 2008.
Final Office Action Summary from U.S. Appl. No. 11/180,991 which was mailed on Jan. 28, 2008.
Office Action Summary from U.S. Appl. No. 11/180,991 which was mailed on Apr. 11, 2008.
Office Action Summary from U.S. Appl. No. 11/180,991 which was mailed on Sep. 18, 2007.
U.S. Appl. No. 11/180,991, filed Jul. 12, 2005.
Office Action Summary from U.S. Appl. No. 11/119,461 which was mailed on Jul. 17, 2008.
Examiner's Answer from U.S. Appl. No. 11/180,991 which was mailed on Sep. 22, 2008.
Office Action Summary from U.S. Appl. No. 11/828,003 which was mailed on May 1, 2008.
Office Action Symmary from U.S. Appl. No. 11/828,012 which was mailed on May 1, 2008.
Office Action Summary from U.S. Appl. No. 11/828,027 which was mailed on Jun. 26, 2008.

* cited by examiner

E-MAIL MANAGER INTERFACE WITH INTEGRATED INSTANT MESSAGING AND PHONE CALL INITIATOR FEATURE

This application claims the benefit of U.S. Provisional Application No. 60/602,728 filed on Aug. 18, 2004, the disclosure of which is incorporated herein by reference.

BACKGROUND AND FIELD OF THE INVENTION

The present invention relates to e-mail, and more particularly to the use of e-mail managers.

DISCLOSURE

A system, method, computer program product and interface is included for providing an e-mail viewer pane including a sender identifier and text of an e-mail that is received from the sender; and an icon displayed simultaneously with the e-mail viewer pane for initiating a phone session with the sender upon the selection of the icon.

BRIEF DESCRIPTION OF THE DRAWINGS

FIG. 3 illustrates a graphical user interface showing an e-mail manager, in accordance with one embodiment.

FIG. 4 illustrates a graphical user interface showing an e-mail viewer pane, in accordance with one embodiment.

DESCRIPTION OF THE PREFERRED EMBODIMENTS

Figure 1:
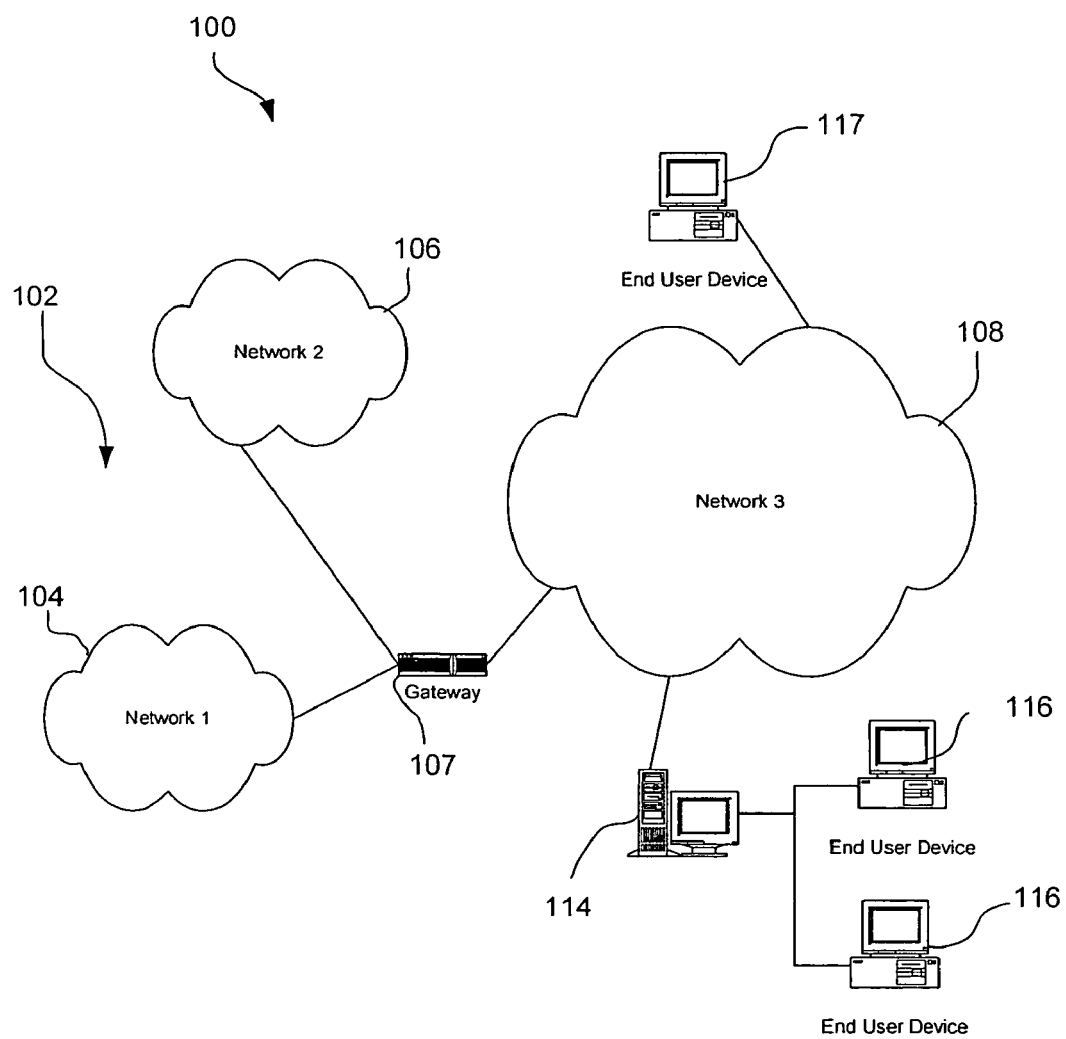
FIG. 1 illustrates a network architecture, in accordance with one embodiment.

FIG. 1 illustrates a network architecture 100, in accordance with one embodiment. As shown, a plurality of networks 102 are provided including a first network 104 and a second network 106. Also included is at least one gateway 107 coupled between the networks 102 and a third network 108. In the context of the present network architecture 100, the networks 104, 106, 108 may each take any form including, but not limited to a local area network (LAN), a wide area network (WAN) such as the Internet, a wireless network, etc. Further, any number of networks may be included.

In use, the gateway 107 serves as an entrance point from the networks 102 to the third network 108. As such, the gateway 107 may function as a router, which is capable of directing a given packet of data that arrives at the gateway 107, and a switch, which furnishes the actual path in and out of the gateway 107 for a given packet.

Further included is at least one server 114 coupled to the third network 108, and which is accessible from the networks 102 via the gateway 107. It should be noted that the server(s) 114 may include any type of computing device/groupware. Coupled to each server 114 is a plurality of user devices 116. Such user devices 116 may include a desktop computer, laptop computer, hand-held computer, printer or any other type of logic. It should be noted that a user device 117 may also be directly coupled to any of the networks, in one embodiment.

Figure 2:
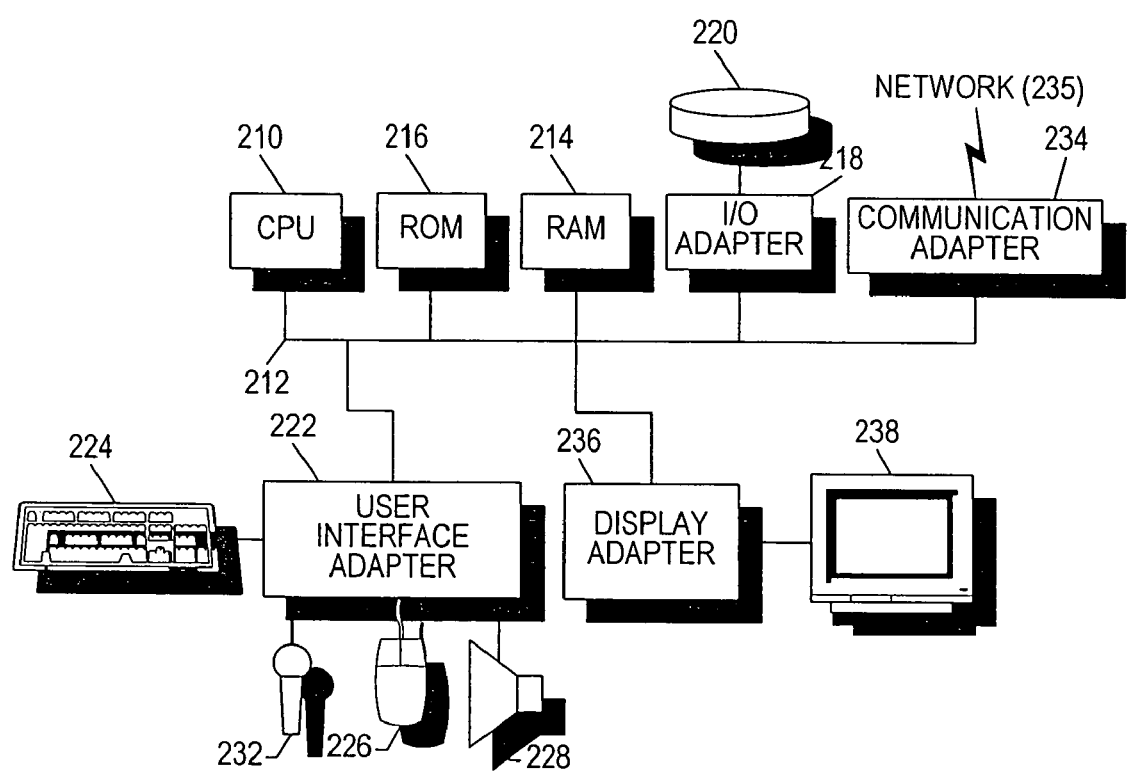
FIG. 2 shows a representative hardware environment that may be associated with the various network components of FIG. 1, in accordance with one embodiment.

FIG. 2 shows a representative hardware environment that may be associated with the various network components of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

For reasons that will soon be set forth, the above computer framework may further be equipped with VoIP capabilities so as to allow phone calls to take place using the computer. For more information regarding such optional capabilities, reference may be made to application Ser. No. 60/587,343, filed Jul. 12, 2004, which is incorporated herein by reference.

Figure 3:
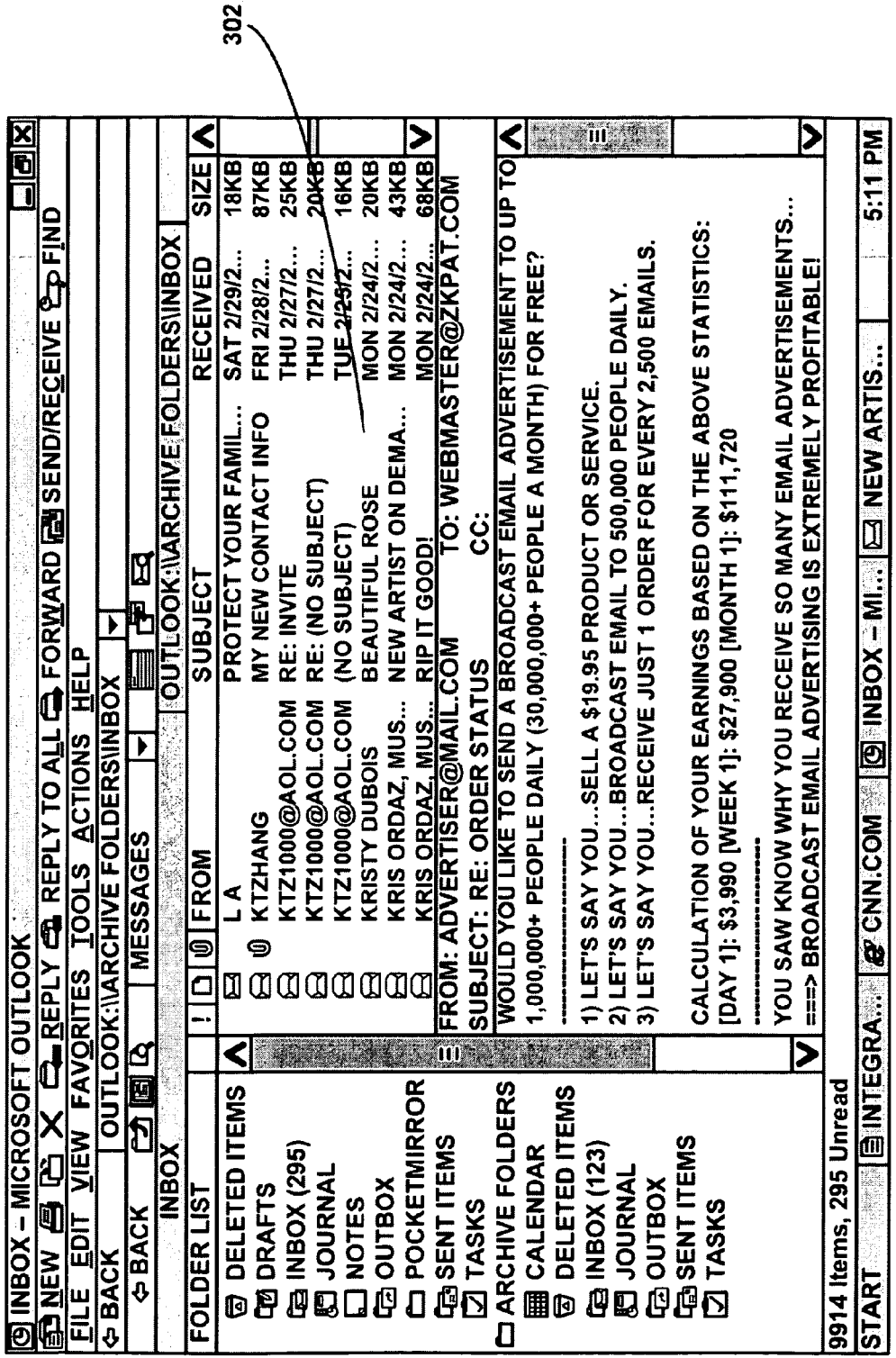
FIG. 3 illustrates a method for reporting on competing activity during strategic intellectual property management utilizing a computer-implemented system, in accordance with one embodiment.

FIG. 3 illustrates a graphical user interface 300 showing an e-mail manager, in accordance with one embodiment. As an option, the present interface disclosed herein may be integrated with the remaining features and/or interfaces. In the alternative, the present interface may be implemented in any desired context.

While the e-mail manager may take any form, it may, in one embodiment, take the form of MICROSOFT OUTLOOK. As shown, a plurality of e-mail headers 302 are listed for the selection thereof, utilizing a mouse or the like.

In the context of the present description, the sender is referred to as the person who sends the original e-mail (to be discussed via a real-time collaboration), and the recipient is the person who receives such initial email.

Figure 4:
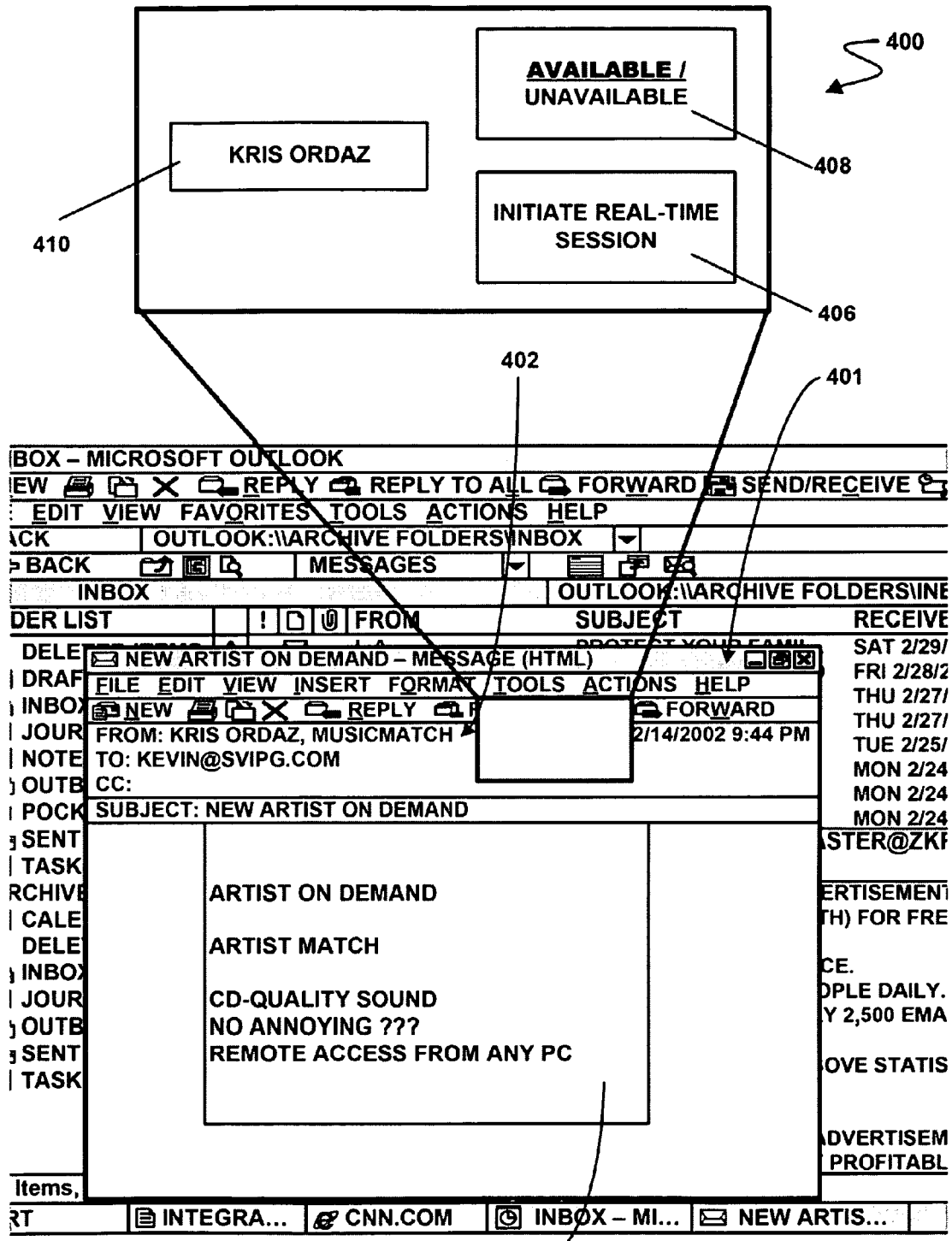
FIG. 4 illustrates an exemplary graphical user interface for registration of intellectual property, in accordance with one embodiment.

FIG. 4 illustrates a graphical user interface 400 showing an e-mail viewer pane 401, in accordance with one embodiment. As an option, the present interface disclosed herein may be integrated with the remaining features and/or interfaces. In the alternative, the present interface may be implemented in any desired context.

Optionally, such e-mail viewer pane may be displayed upon the selection of an e-mail header (see e-mail headers 302 of FIG. 3, for example)

It should be noted that the e-mail viewer pane 401 may include any pane capable of showing a sender identifier 402 and text 404 of an e-mail that is received from the sender. For example, the e-mail viewer pane 401 may include a preview pane, a dedicated pane (like that shown), a window, or any other display.

For reasons that will soon become apparent, an icon 406 is displayed simultaneously with the e-mail viewer pane for initiating a real-time messaging session with the sender upon the selection thereof.

In one embodiment, the real-time messaging session may include a NET MEETING session, a WINDOWS MESSENGER, a session utilizing an instant messaging protocol, or any other messaging session where the messages are in real-time (in the present description, real-time may include "substantially real-time).

Instant messaging (sometimes called IM or IMing) is the ability to easily see whether a chosen friend or co-worker is connected to the Internet and, if they are, to exchange messages with them. Instant messaging differs from ordinary e-mail in the immediacy of the message exchange and also makes a continued exchange simpler than sending e-mail back and forth. Most exchanges are text-only. However, some services, such as AOL, allow voice messaging and file sharing.

In order for IMing to work, both users (who must subscribe to the service) must be online at the same time, and the intended recipient must be willing to accept instant messages. (It is possible to set your software to reject messages.) An attempt to send an IM to someone who is not online, or who is not willing to accept IMs, will result in notification that the transmission cannot be completed. If the online software is set to accept IMs, it alerts the recipient with a distinctive sound, a window that indicates that an IM has arrived and allowing the recipient to accept or reject it, or a window containing the incoming message.

Under most conditions, IMing is truly "instant." Even during peak Internet usage periods, the delay is rarely more than a second or two. It is possible for two people to have a real-time online "conversation" by IMing each other back and forth. Once in a while, a person might receive an IM from someone while already engaged in a chat with someone else, and decide to carry on IM chats with both people independently and concurrently.

As shown, the icon may be situated on the e-mail viewer pane. Moreover, an indicator 408 may be displayed simultaneously with the e-mail viewer pane for indicating whether the sender is available for the real-time messaging session. This may be accomplished by sending signals back and forth between a first computer associated with the recipient and a second computer associated with the sender. In use, a person may manually (by some other automatic) enable their real-time messaging session service, so that the indicator shows that a session may be initiated.

Optionally, a database may be included having a plurality of e-mail addresses correlated with real-time messaging service addresses. See Table 1 below.

TABLE 1

| Name 1 | e-mail address 1 | real-time messaging service address 1 |
| Name 2 | e-mail address 2 | real-time messaging service address 2 |
| Name 3 | e-mail address 3 | real-time messaging service address 3 |
| Name 4 | e-mail address 4 | real-time messaging service address 4 |
| Name 5 | e-mail address 5 | real-time messaging service address 5 |

In use, one of the real-time messaging service addresses may be identified based on an e-mail address of the sender, utilizing the database. This may optionally happen when or before the e-mail viewer pane is displayed.

Further displayed for identifying the sender is a sender identifier 410 (i.e. see Name1-3 above), utilizing the identified real-time messaging service address (i.e. using one to look-up the other).

While not shown, further displayed on the e-mail viewer pane is an indication of whether the sender requests a real-time session. This indicator may be set by the sender selecting an icon associated with the e-mail prior to sending.

Figure 5:
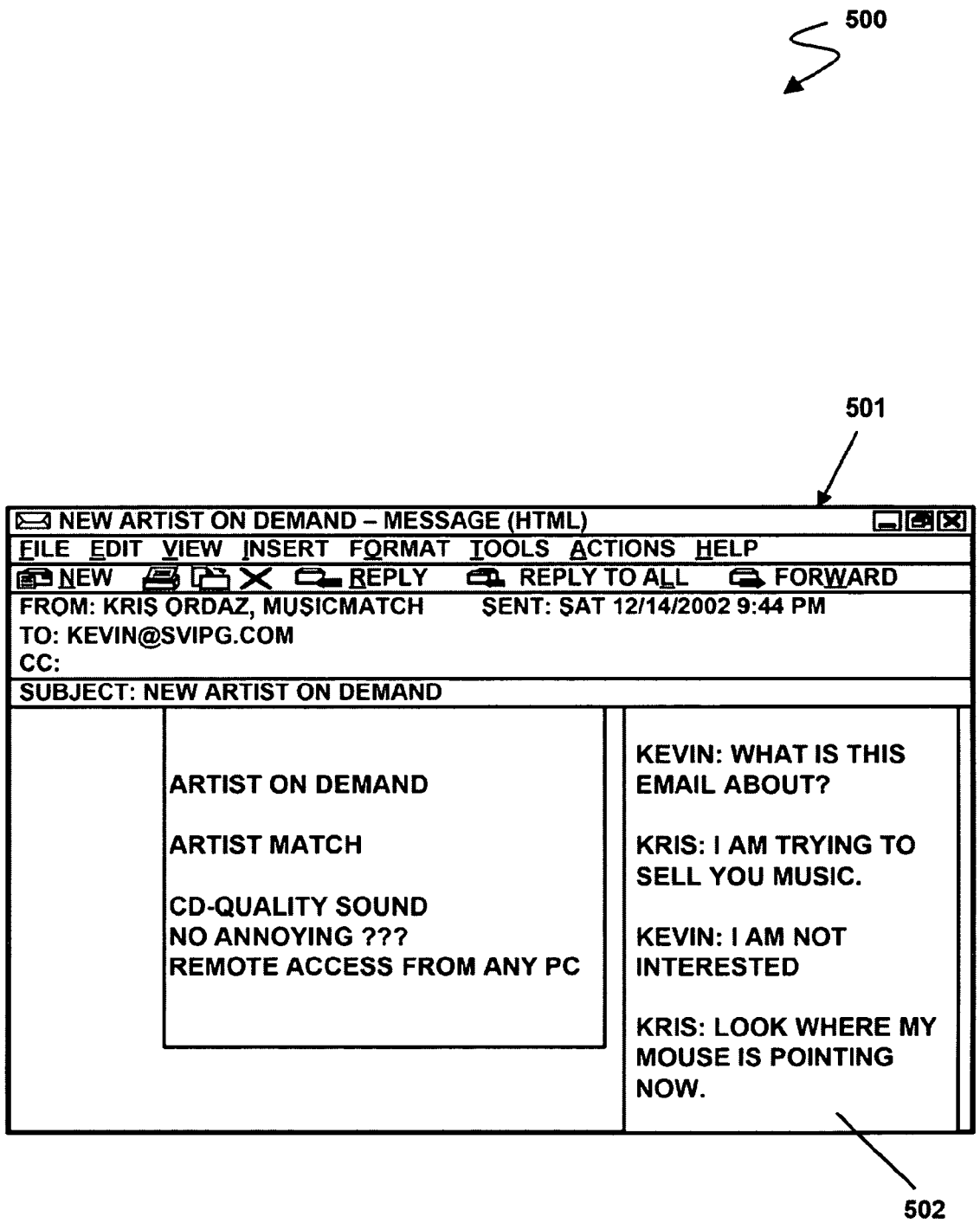
FIG. 5 illustrates a graphical user interface showing an e-mail viewer pane, in accordance with one embodiment, where a first real-time messaging service window may be displayed simultaneously with the e-mail viewer pane on an interface at a first computer of recipient, upon selection of the icon.

FIG. 5 illustrates a graphical user interface 500 showing an e-mail viewer pane 501, in accordance with one embodiment, where a first real-time messaging service window 502 may be displayed simultaneously with the e-mail viewer pane 501 on an interface at a first computer of recipient, upon selection of the icon (see for example, icon 406. As an option, the present interface disclosed herein may be integrated with the remaining features and/or interfaces. In the alternative, the present interface may be implemented in any desired context.

At such time, it should be noted that a second real-time messaging service window is displayed on an interface at a second computer of the sender, upon selection of such icon.

Since the sender and recipient may want to discuss the e-mail contents, the e-mail and associated text included with the e-mail viewer pane is displayed simultaneously with the second real-time messaging service window on the interface at the second computer of the sender, upon selection of the icon. In one embodiment, just a header of the relevant email may be automatically displayed so that the sender knows what email the recipient is referring.

Figure 5A:
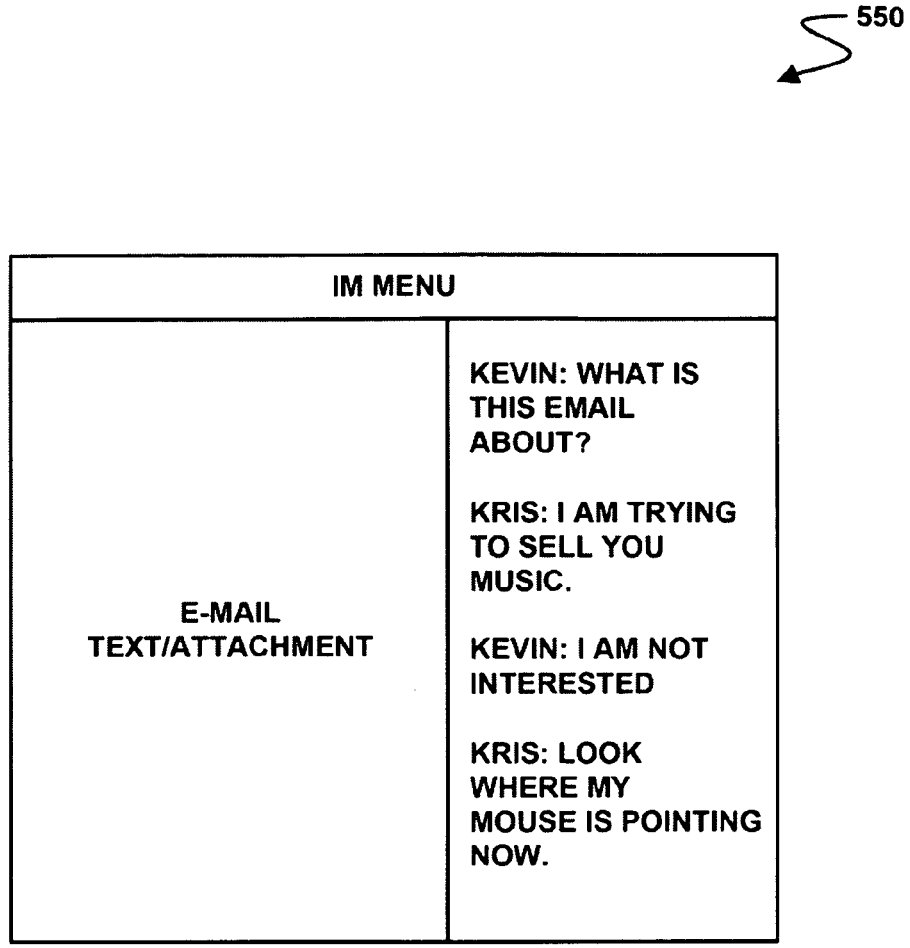
FIG. 5A illustrates a graphical user interface associated with an application independent of the e-mail manager.

See an exemplary interface shown in FIG. 5A. As an option, such interface disclosed herein may be integrated with the remaining features and/or interfaces. In the alternative, the present interface may be implemented in any desired context.

Note that an e-mail manager may or may not be necessary for such. In FIG. 5A, an extra window 550 is shown to display the email.

So that the actual e-mail need not necessarily be transmitted for this to be accomplished, an e-mail identifier may be transmitted from the first computer to the second computer. Such identifier may include a signature that is automatically generated using a common hashing process at each end when the email is send and received, respectively. Or, other type of identifiers (i.e. recipient, sender, time, etc.) or anything else may be used.

To this end, the e-mail and associated text displayed on the interface at the second computer of the sender may be retrieved from memory in the second computer, utilizing the e-mail identifier. In the alternative, the e-mail and associated text displayed on the interface at the second computer of the sender may be retrieved from first computer, if the e-mail and associated text is unavailable on the second computer. Of course, the latter technique may be faster.

So that the sender and recipient can collaborate as they discuss the email and its contents, synchronization signals may be sent back and forth (using the real-time session protocol, optionally) so that any input (i.e. manipulation of the text, mouse movements, etc.) are seen on both the sender and recipient screens. Thus, any input by the recipient with respect the e-mail on the first computer is shown on the second computer.

Figure 6:
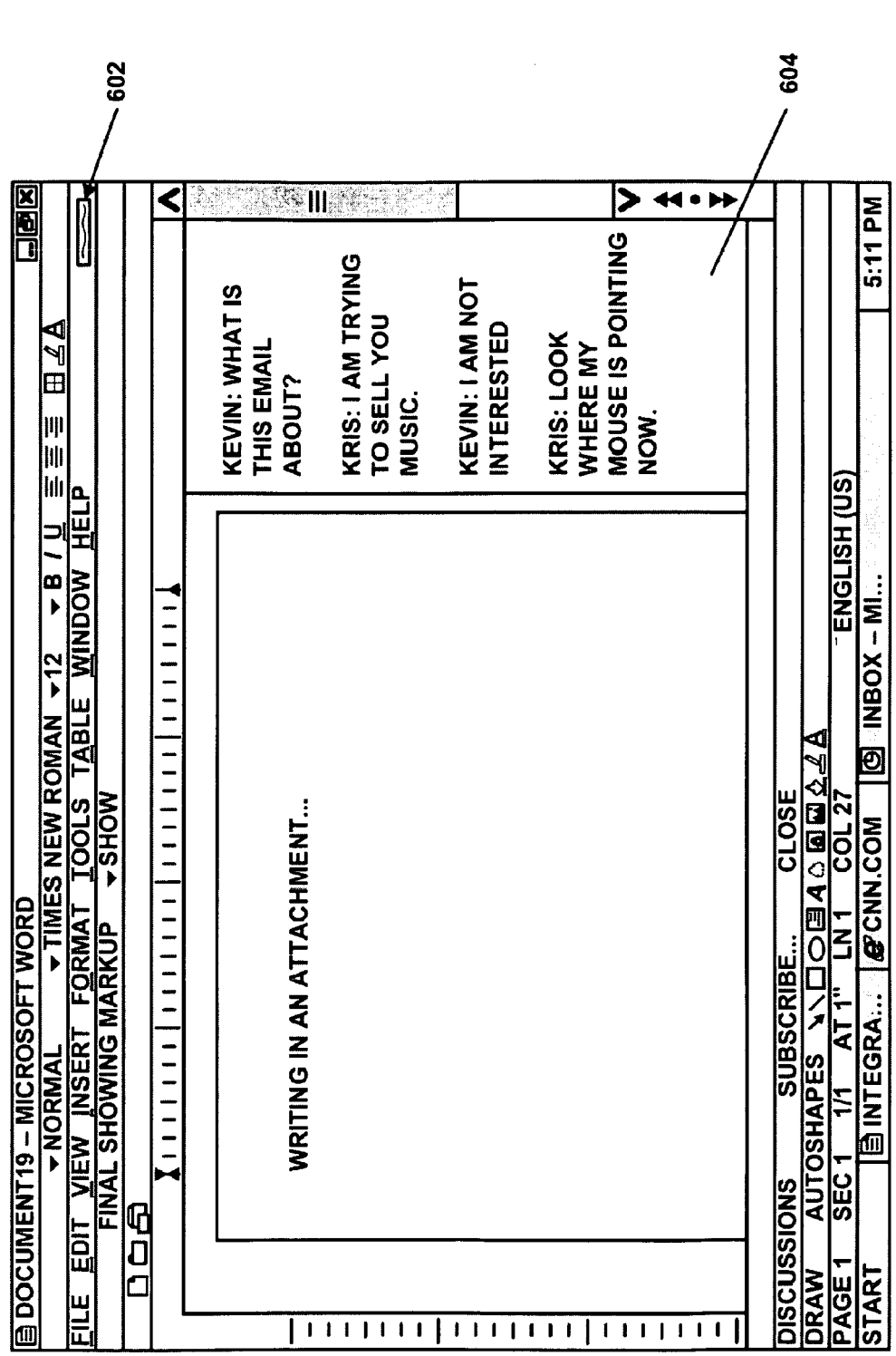
FIG. 6 illustrates a graphical user interface a second real-time messaging service window may be displayed simultaneously with the e-mail viewer pane on an interface at a second computer of sender.

It should be noted that all of the foregoing techniques may be applied to any attachments associated with the e-mail. For example, an application separate from an e-mail manager application (i.e. EXCEL, WORD, POWERPOINT, ACROBAT, etc.) may be initiated upon selection of an attachment to the e-mail. Note the graphical user interface 600 of FIG. 6.

For example, during use, prior to initiating a real-time messenger session and after the attachment is opened, a second icon 602 may be displayed simultaneously with an open view of the attachment for initiating a real-time messaging session with the sender upon the selection of second the icon.

Thus, a real-time messaging service window 604 is displayed simultaneously with the open view of the attachment, upon selection of the second icon 602. In such case, the adjacent window (see FIG. 5A) may include the attachment, in a manner similar to the manner in which the text of the email is displayed above.

Still yet, in another example, after initiating a real-time messenger session like the one shown in FIG. 5, and after the attachment is opened, such real-time messaging service window 604 (see FIG. 6) may displayed with the same content as that shown in FIG. 5, so that the virtual conversation can be continued as focus is switched to the attachment.

As an option, the foregoing techniques may even be applied with respect to the (i.e. EXCEL, WORD, POWERPOINT, ACROBAT, etc.) alone, independent of the e-mail manager.

One exemplary method, in accordance with one embodiment, may thus comprise: A method, comprising: displaying an e-mail viewer pane including a sender identifier and text of an e-mail that is received from the sender, wherein an indicator is displayed simultaneously with the e-mail viewer pane for indicating whether the sender is available for the real-time messaging session; identifying one of a plurality of real-time messaging service addresses based on an e-mail address of the sender; displaying the identified real-time messaging service addresses simultaneously with the e-mail viewer pane; determining whether the sender is available for a real-time session utilizing the identified real-time messaging service addresses; displaying an indicator simultaneously with the e-mail viewer pane for indicating whether the sender is available for the real-time messaging session; upon selection of the icon, a first real-time messaging service window is displayed simultaneously with the e-mail viewer pane on an interface at a first computer of recipient; displaying a second real-time messaging service window on an interface at a second computer of the sender, upon selection of the icon; transmitting an e-mail identifier from the first computer to the second computer; retrieving the e-mail and associated text from memory in the second computer, utilizing the e-mail identifier; retrieving at least a portion of the e-mail from first computer, if the e-mail and associated text is unavailable on the second computer; displaying the retrieved e-mail and associated text or the at least a portion thereof simultaneously with the second real-time messaging service window at the second computer of the sender; showing on the second computer any input by the recipient with respect to the e-mail; initiating an application separate from an e-mail manager application, upon selection of an attachment to the e-mail; wherein the attachment is displayed simultaneously at the first and second computer.

Of course, the foregoing techniques may be carried out using a "SENT" folder (so that the sender and recipient can discuss sent items in real-time). In such embodiment, an e-mail viewer pane is provided including a recipient identifier and text of an e-mail that is sent to the recipient; and an icon displayed simultaneously with the e-mail viewer pane for initiating a real-time messaging session with the recipient upon the selection of the icon.

As mentioned earlier, the above computer framework may further be equipped with VoIP capabilities so as to allow phone calls to take place using the computer. For more information regarding such optional capabilities, reference may be made to application Ser. No. 60/587,343, filed Jul. 12, 2004, which is incorporated herein by reference.

To this end, instead of an icon displayed simultaneously with the e-mail viewer pane for initiating a real-time messaging session with the sender upon the selection of the icon, an icon displayed simultaneously with the e-mail viewer pane for initiating a VoIP phone call with the sender upon the selection of the icon.

Thus, instead of an IM session, a phone call may be initiated with each of the capabilities outlined above (i.e. reviewing the e-mail, etc. in real-time, etc.). Of course, it is thus apparent that, instead of IM messaging addresses, phone numbers would have to be correlated with the e-mail addresses, etc.

While various embodiments have been described above, it should be understood that they have been presented by way of example only, and not limitation. For example, any of the network components may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A computer accessible storage medium having computer code stored therein for displaying a graphical user interface, comprising:

computer code for displaying an e-mail viewer pane including a sender identifier and text of an e-mail that is received from a sender; and computer code for displaying an icon simultaneously with and on a toolbar portion of the e-mail viewer pane that is outside and separate from the text of the e-mail for initiating a phone session with the sender utilizing a same application with which the email viewer pane is displayed, upon selection of the icon;

wherein a first phone session window is displayed simultaneously with the e-mail viewer pane on an interface at a first computer of a recipient, upon selection of the icon;

wherein a second phone session window is displayed on an interface at a second computer of the sender, upon selection of the icon;

wherein the e-mail and associated text included with the e-mail viewer pane are displayed simultaneously with the second phone session window on the interface at the second computer of the sender, upon selection of the icon;

wherein an e-mail identifier is transmitted from the first computer to the second computer;

wherein the e-mail and associated text displayed on the interface at the second computer of the sender are retrieved from memory in the second computer, utilizing the e-mail identifier.

2. The computer code as set forth in claim 1, wherein an indicator is displayed simultaneously with the e-mail viewer pane for indicating whether the sender is available for the phone session.

3. The computer code as set forth in claim 1, wherein a database is included having a plurality of e-mail addresses correlated with phone numbers.

4. The computer code as set forth in claim 3, wherein one of the phone numbers is identified based on an e-mail address of the sender, utilizing the database.

5. The computer code as set forth in claim 4, wherein an indicator is displayed simultaneously with the e-mail viewer pane for indicating whether the sender is available for the phone session.

6. The computer code as set forth in claim 1, wherein the e-mail and associated text displayed on the interface at the second computer of the sender are retrieved from first computer, if the e-mail and associated text are unavailable on the second computer.

7. The computer code as set forth in claim 1, wherein any input by the recipient with respect to the e-mail on the first computer is shown on the second computer.

8. The computer code as set forth in claim 1, wherein an application separate from an e-mail manager application is initiated upon selection of an attachment to the e-mail.

9. The computer code as set forth in claim 8, wherein a second icon is displayed simultaneously with an open view of the attachment for initiating a second phone session with the sender upon the selection of the second icon.

10. A computer accessible storage medium having computer code stored therein for displaying a graphical user interface, comprising:

computer code for causing display of an e-mail viewer pane including a recipient identifier and text of an e-mail that is sent to a recipient; and computer code for causing display of an icon simultaneously with and on a toolbar portion of the e-mail viewer pane that is outside and separate from the text of the e-mail for initiating a phone session with the recipient utilizing a same application with which the email viewer pane is displayed, upon selection of the icon;

wherein a first phone session window is displayed simultaneously with the e-mail viewer pane on an interface at a first computer of a sender, upon selection of the icon;

wherein a second phone session window is displayed on an interface at a second computer of the recipient, upon selection of the icon;

wherein the e-mail and associated text included with the e-mail viewer pane are displayed simultaneously with the second phone session window on the interface at the second computer of the recipient, upon selection of the icon, wherein an e-mail identifier is transmitted from the first computer to the second computer;

wherein the e-mail and associated text displayed on the interface at the second computer of the recipient are retrieved from memory in the second computer, utilizing the e-mail identifier.

11. A computer accessible storage medium having a computer program product comprising computer code stored therein, comprising:

computer code for causing display of a textual message viewer pane including a sender identifier and text of a textual message that is received from a sender;

computer code for causing display of an icon simultaneously with and on a toolbar portion of the textual message viewer pane that is outside and separate from the text of the textual message for initiating a phone session with the sender utilizing a same application with which the textual message viewer pane is displayed, upon selection of the icon;

computer code for causing display of a first phone session window simultaneously with the textual message viewer pane on an interface at a first computer of a recipient, upon selection of the icon;

computer code for causing display of a second phone session window on an interface at a second computer of the sender, upon selection of the icon, and further causing the textual message and associated text included with the textual message viewer pane to be displayed simultaneously with the second phone session window on the interface at the second computer of the sender; and computer code for causing a textual message identifier to be transmitted from the first computer to the second computer, wherein the textual message and associated text displayed on the interface at the second computer of the sender are retrieved from memory in the second computer, and the textual message and associated text are displayed on the interface at the second computer of the sender utilizing the textual message identifier.

12. The computer program product as set forth in claim 11, wherein an indicator is displayed simultaneously with the textual message viewer pane for indicating whether the sender is available for the phone session.

13. The computer program product as set forth in claim 12, wherein the indicator is manually configured.

14. The computer program product as set forth in claim 12, wherein the indicator is automatically configured.

15. The computer program product as set forth in claim 11, wherein a database is included having a plurality of textual message addresses correlated with phone numbers.

16. The computer program product as set forth in claim 15, wherein one of the phone numbers is identified based on the sender identifier, utilizing the database.

17. The computer program product as set forth in claim 11, wherein an e-mail capability, an instant messaging capability, and a phone capability are integrated in a single interface.

18. The computer program product as set forth in claim 11, wherein an e-mail capability, an instant messaging capability, and a phone capability are accessible via a single interface.

19. The computer program product as set forth in claim 11, wherein an e-mail capability, an instant messaging capability, and a phone capability are accessible via the textual message viewer pane.

20. The computer program product as set forth in claim 11, further comprising computer code for causing display of a document interface associated with an application that is separate from a textual message application, in response to a user action configured to switch focus to a document generated utilizing at least one of a word processor application, a spreadsheet application, and a presentation application.

21. The computer program product as set forth in claim 11, further comprising computer code for causing display of a document interface, in response to a user action configured to switch focus to a document.

22. The computer program product as set forth in claim 21, wherein the document interface is for displaying the document; allowing a collaboration over a network, in association with the document; and displaying the collaboration in conjunction with the document in the form of manipulation of text of the document.

23. The computer program product as set forth in claim 21, wherein the document interface is capable of displaying an indicator for indicating at least one person available for a document real-time session.

24. The computer program product as set forth in claim 23, wherein the document interface is capable of displaying a second icon for initiating the document real-time session, upon selection of the second icon.

25. The computer program product as set forth in claim 11, wherein the first phone session window is integrated with the textual message viewer pane.

26. The computer program product as set forth in claim 11, wherein the computer code is configured for operating on a handheld computer.

27. The computer program product as set forth in claim 11, wherein the phone session is carried out utilizing a VoIP protocol.

28. The computer program product as set forth in claim 11, wherein the textual message viewer pane includes an instant message viewer pane.

29. The computer program product as set forth in claim 11, wherein the textual message viewer pane includes an e-mail viewer pane.

30. A computer accessible storage medium having a computer program product comprising computer code stored therein, comprising:
    computer code for working in association with an application configured for displaying a textual message viewer pane including a sender identifier and text of a textual message that is received from a sender;
    computer code for causing display of an icon simultaneously with and on a toolbar portion of the textual message viewer pane that is outside and separate from the text of the textual message for initiating a phone session with the sender utilizing a same application with which the textual message viewer pane is displayed, upon selection of the icon;
    computer code for causing display of a first phone session window simultaneously with the textual message viewer pane on an interface at a first computer of a recipient, upon selection of the icon;
    computer code for causing display of a second phone session window on an interface at a second computer of the sender, upon selection of the icon, and further causing the textual message and associated text included with the textual message viewer pane to be displayed simultaneously with the second phone session window on the interface at the second computer of the sender; and
    computer code for causing a textual message identifier to be transmitted from the first computer to the second computer, wherein the textual message and associated text displayed on the interface at the second computer of the sender are retrieved from memory in the second computer utilizing the textual message identifier.

31. A system including a computer accessible storage medium, comprising:
    logic for causing display of a textual message viewer pane including a sender identifier and text of a textual message that is received from a sender;
    logic for causing display of an icon simultaneously with and on a toolbar portion of the textual message viewer pane that is outside and separate from the text of the textual message for initiating a phone session with the sender utilizing a same application with which the textual message viewer pane is displayed, upon selection of the icon;
    logic for causing display of a first phone session window simultaneously with the textual message viewer pane on an interface at a first computer of a recipient, upon selection of the icon;
    logic for causing display of a second phone session window on an interface at a second computer of the sender, upon selection of the icon, wherein the textual message and associated text included with the textual message viewer pane are displayed simultaneously with the second phone session window on the interface at the second computer of the sender; and
    logic for causing a textual message identifier to be transmitted from the first computer to the second computer, wherein the textual message and associated text displayed on the interface at the second computer of the sender are retrieved from memory in the second computer utilizing the textual message identifier.

* * * * *